United States Patent [19]

Bemm et al.

[11] Patent Number: 4,570,468
[45] Date of Patent: Feb. 18, 1986

[54] DEVICE FOR LOCKING THE ROTATIONAL MOVEMENT OF A STEERING COLUMN OF A MOTOR VEHICLE

[75] Inventors: Wulf Bemm, Cologne; Rolf Brückner, Velbert; Günter Eigelshofen, Wuppertal, all of Fed. Rep. of Germany

[73] Assignee: Neiman S.A., Courbevoie, France

[21] Appl. No.: 579,897

[22] PCT Filed: Apr. 14, 1983

[86] PCT No.: PCT/EP83/00104
§ 371 Date: Dec. 23, 1983
§ 102(e) Date: Dec. 23, 1983

[87] PCT Pub. No.: WO83/03802
PCT Pub. Date: Nov. 10, 1983

[30] Foreign Application Priority Data

Apr. 30, 1982 [DE] Fed. Rep. of Germany ....... 3216168

[51] Int. Cl.⁴ ............................................. B60R 25/02
[52] U.S. Cl. ........................................ 70/252; 70/185; 70/386
[58] Field of Search ................ 70/182, 183, 184, 185, 70/186, 252, 386; 188/82.84, 75, 82.6, 82.2

[56] References Cited

U.S. PATENT DOCUMENTS 3,528,534  9/1970  Benson ............................... 188/82.84
3,937,312  2/1976  Gehrke ............................... 188/82.84

FOREIGN PATENT DOCUMENTS 1020888  12/1957  Fed. Rep. of Germany ... 188/82.84
2118265   7/1972  France .
2456644   1/1981  France .................................. 70/252
WO83/03082  9/1983  PCT Int'l Appl. .................... 70/252

*Primary Examiner*—Robert L. Wolfe
*Attorney, Agent, or Firm*—Karl F. Ross; Herbert Dubno

[57] ABSTRACT

The invention relates to a device for locking the rotational movement of a steering column of a motor vehicle by means of a clamp locking mechanism with rollers (4) parallel to the axis, which rollers clamp the steering column in both rotational directions between a cylindrical track and clamping surfaces oblique to the track and are guided in a coaxial cage rotatable about the steering column. The cage can be carried along by the steering column in both rotational directions in each case into one of the two clamping positions and can be fixed in a central position located between the two clamping positions, in which central position the rollers release the steering column. All the rollers (4) are surrounded externally by at least one elastic ring (6) coaxial to the column (1), which ring elastically loads the rollers towards the steering column.

7 Claims, 3 Drawing Figures

DEVICE FOR LOCKING THE ROTATIONAL MOVEMENT OF A STEERING COLUMN OF A MOTOR VEHICLE

CROSS REFERENCE TO RELATED APPLICATIONS

This application is a national phase application for the international application PCT/EP83/00104 filed Apr. 14, 1983 under the Patent Cooperation Treaty and claims the priority under the International Convention of a German application No. P 32 16 168.9 filed Apr. 30, 1982.

FIELD OF THE INVENTION

The invention relates to a device for locking the rotational movement of the steering column of a motor vehicle by means of a clamp locking mechanism with rollers parallel to the axis, which rollers clamp the steering column in both rotational directions between a cylindrical track and clamping surfaces oblique to the track and are guided in a coaxial cage rotatable about the steering column, which coaxial cage can be carried along by the steering column in both rotational directions in each case into one of the two clamping positions and can be fixed in a central position located between the two clamping positions, in which central position the rollers release the steering column.

BACKGROUND OF THE INVENTION

A locking device of this type is known from French Pat. No. A2,456,644. In this device, the cage, when it is not fixed, takes up different positions because the frictional engagement between the steering column and the cage does not have a constant value. In particular, the frictional engagement is altered substantially by temperature differences.

OBJECT OF THE INVENTION

The object of the invention is to improve a device of the type mentioned at the beginning so that the cage is carried along evenly and exactly by the column.

SUMMARY OF THE INVENTION

This object is achieved, according to the invention, by providing that all the rollers are surrounded externally by at least one elastic ring coaxial to the column, which ring elastically loads the rollers towards the steering column.

The elastic ring according to the invention always presses the rollers with a constant force against the steering column so that an exact and even frictional engagement between the cage and the column is guaranteed. By this means, the positions of the cage on the column are determined exactly.

The device has small assembly dimensions in the axial and radial directions, is simple and economical to manufacture, and is easy to install.

The ring is particularly economical and spacesaving if it consists of rubber or an elastic plastic. A very simple design arrangement is produced when the rollers protrude beyond the outside of the cage and the ring is located outwardly of the cage. The outside of the cage and the ring can then be further surrounded externally by an additional part of the cage.

A very even compressive loading is obtained if a respective elastic ring is provided for each of the two sides of an outer fixed clamping ring provided with the clamping surfaces. It is important that the cage can be arrested in a cental position between the two clamping positions, so that clamping of the steering column is certain to be avoided while the vehicle is travelling. For this purpose the insertion of a pin in a recess of the cage is proposed in French Pat. No. A2,456,644. However, this pin only enters this recess if the latter is aligned with the pin, so that the steering column must be moved backwards and forwards by the steering wheel until this situation occurs.

In contrast, in the device according to the invention, the cage has a protrusion externally which is brought into position and arrested by a part controlled by the steering lock, in which position the cage does not lock. By this means, the part which arrests the cage also simultaneously establishes the position of the cage in which the latter does not lock.

It is preferred that a part controlled by the steering lock places the cage in the nonclamping position by means of a wedge mechanism, in particular a double wedge mechanism. This yields a particularly simple and safe design. Furthermore the cage protrusion or the part controlled by the steering lock should have a recess with two wedge surfaces, in which recess a wedge or a curved protrusion, in particular a sphere, of the part controlled by the steering lock or of the cage protrusion engages so as to produce a centering action.

BRIEF DESCRIPTION OF THE DRAWING

One embodiment example of the invention is shown in the drawing and is described in more detail below. In the drawing.

SPECIFIC DESCRIPTION

Figure 1:
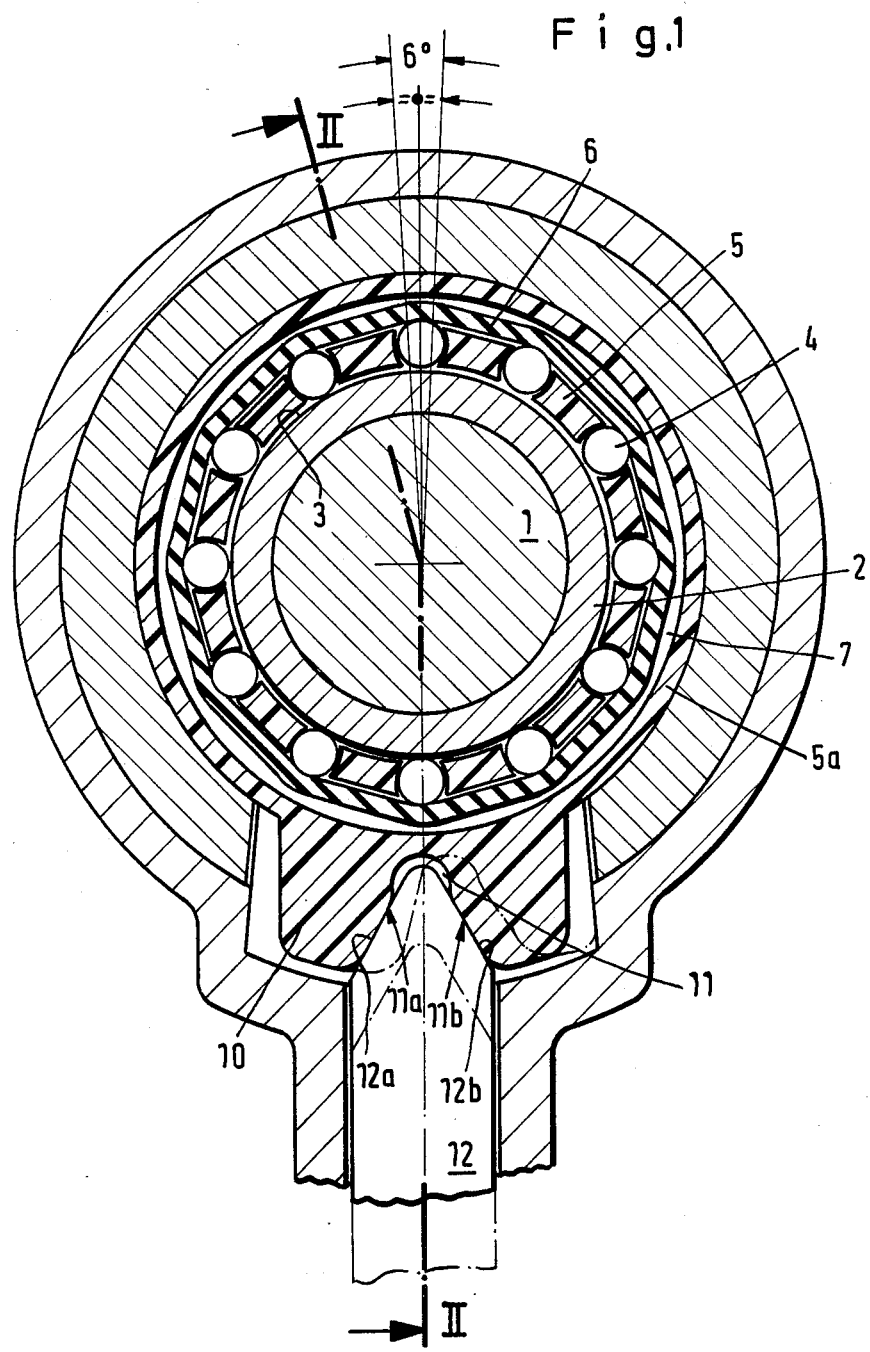
FIG. 1 is a section through the device at right-angles to the steering column at the level of an elastic ring (Section along line I—I in FIG. 2)
Figure 2:
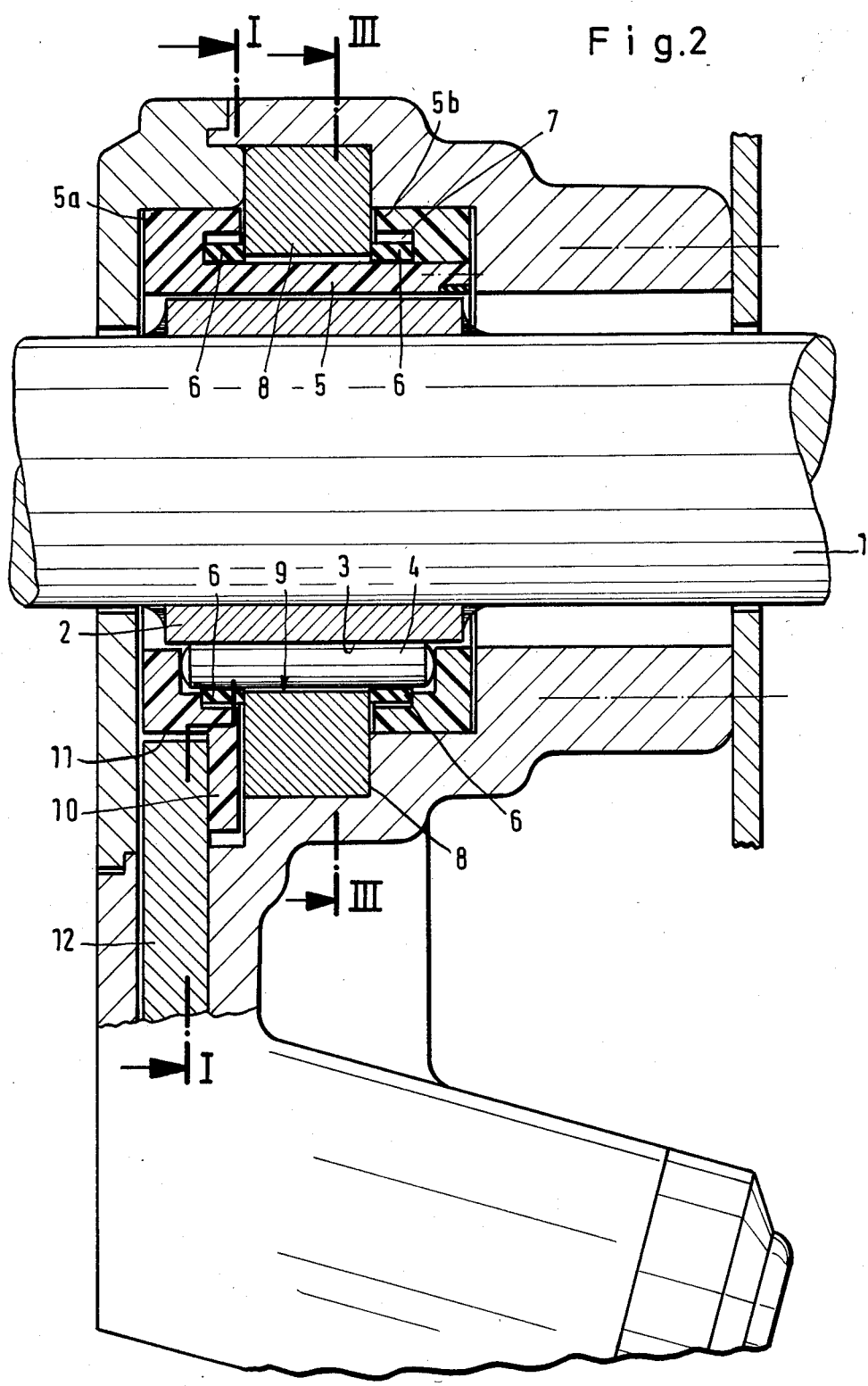
FIG. 2 is a section along line II—II in FIG. 1.
Figure 3:
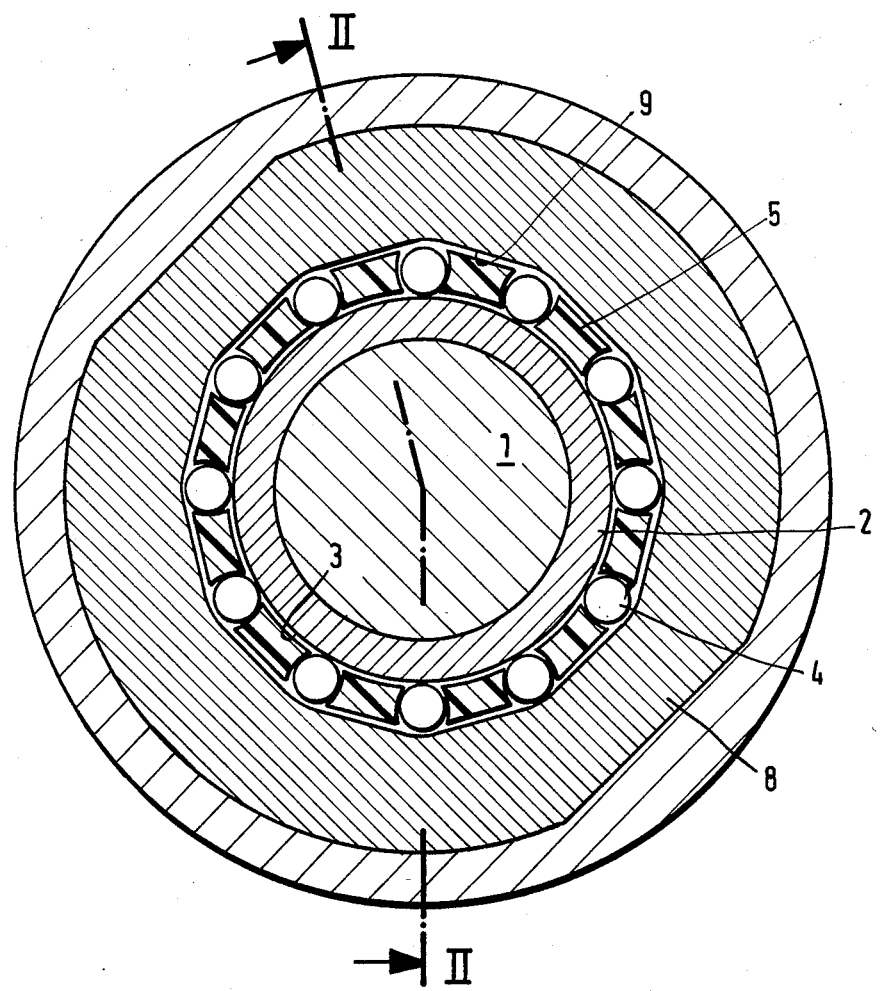
FIG. 3 is a section along line III—III in FIG. 2.

A bush 2 is fastened, so as to be secure against rotation, on the steering column 1 of a motor vehicle. The outer cylindrical surface of the bush 2 forms a cylindrical track 3 for cylindrical rollers 4 which are located with their axes parallel to the axis of rotation of the steering column 1 and are supported so as to be evenly spaced around the bush 2 in a cage 5. Alternatively, the bush 2 need not be omitted and the cylindrical surface of the steering column 1 can form the track for the rollers.

The cage 5 is externally surrounded by two elastic rings 6, which rest on the rollers 4 and radially load the latter towards the steering column 1. This radial loading is made possible by the fact that that the sections of the cage 5 located between the rollers 4 have a smaller thickness in the radial direction than the diameter of the rollers 4.

The cage 5 is surrounded coaxially at a distance from the cage 5 by an annular cage part 5a, 5b, so that the elastic rings 6 can lie within an annular space 7 between the inner and outer cage parts. This outer cage part is divided into an annular first part 5a, which is formed integrally with the cage 5, and a second part 5b, which is placed onto the cage 5, from the end. Between the parts 5a and 5b, there is an annular groove-shaped gap within which lies a clamping ring 8. The clamping ring 8 extends from outside so far into the cage 5 between the two elastic rings 6 that, on its inner surface, the rollers 4 can come into clamping contact. For this purpose, the inner surface forms straight or curved recesses and oblique, straight or curved clamping surfaces 9 which, in the central position of the cage 5, shown in the figures, allows sufficient space for the rollers and, in the case of a rotation of the cage in both rotational directions, allows the rollers to jam between the clamping ring 8, which is secured against rotation, and the track 3.

The cage part 5a has integrally formed on it a radial protrusion 10 which has, on its outer side, a wedge shaped recess 11 which forms two oblique wedge surfaces 11a and 11b symmetrically outwards about a radius of the steering column. A pin 12 operated by a steering lock, not shown, can be driven into the recess 11, which pin 12 has two wedge surfaces 12a, 12b on its end directed towards the steering column 1, which wedge surfaces lie parallel to the surfaces 11a and 11b when the cage 5 is in the central position. The pin 12 can also be located parallel to the axis of the steering column and be movable in the longitudinal direction, in which case the recess 11 must be located at 90° to the orientation shown in the protrusion 10. Intermediate positions are also possible between the radial position of the pin and the position parallel to the axis.

When the pin 12 engages in the recess 11 by means of its point directed towards the steering colunn, the cage 5 is locked in its central position, so that the steering column 1 can freely rotate without being clamped by the rollers 4. The pin 12 only reaches this position if the key is inserted in the steering lock and the pin 12 is pushed into this position by rotation of the cylindrical core. With the key withdrawn, the pin moves at least partially out of the recess 11, so that the cage can move to a limited extent in both rotational directions. Because of the friction generated by the elastic rings 6, the cage 5 is, on rotation of the steering column 1, carried along in the same rotational direction to the point where the rollers jam between the clamping surfaces 9 and the track 3 and further rotation of the steering column is therefore prevented. In order to be able to absorb these radially outward-acting forces generated by the rollers, the clamping ring 8 is manufactured from a very high-strength steel.

The angle of rotation between the two clamping positions of the cage is only 6°. In both clamping positions of the cage 5, the recess 11 is only rotated relative to the point of the pin 12 to such an extent that the pin point can still penetrate partially into the recess and a wedge surface of the pin can come into contact with a wedge surface of the recess, so that a further insertion of the pin 12 into the recess 1 generates a movement of the cage towards the central position because of the wedge action.

The operation of the locking pin occurs in the reverse functional manner compared with the current steering lock system. Due to the rotation of the cylinder core, by means of the key, in the opening direction, the locking pin is driven into the cage with positive connection and holds the cage in the central position. This position is maintained until, due to the reverse rotation and withdrawal of the key, an elastic return positioning of the locking pin occurs. The steering is locked by deflection of the cage by 3°, in each case, from the central position.

We claim:

1. In a device for locking the rotational movement of a steering column of a motor vehicle by means of a clamp locking mechanism with rollers parallel to an axis of said steering column, which rollers clamp the steering column in both rotational directions between a cylindrical track and clamping surfaces oblique to the track and are guided in a coaxial cage rotatable about the steering column, which coaxial cage can be carried along by the steering column in both rotational directions into one of two clamping positions and can be fixed in a central position located between the two clamping positions, in which central position the rollers release the steering column, the improvement wherein all of the rollers are surrounded externally by at least one elastic ring coaxial to the column and loading the rollers elastically towards the steering column.

2. The improvement defined in claim 1 wherein the ring consists of rubber or an elastic plastic.

3. The improvement defined in claim 1 wherein the rollers protrude beyond the outside of the cage and the ring is located beyond the outside of the cage.

4. The improvement defined in claim 1 wherein an elastic ring is located to each of two sides of an outer fixed clamping ring provided with said clamping surfaces.

5. The improvement defined in claim 1 wherein said cage has a protrusion externally which is positioned to be brought into a position and arrested by a pin controlled by a steering lock, in which position the cage does not lock.

6. The improvement defined in claim 5 wherein said pin, controlled by said steering lock, places the cage in the non-clamping position by means of a wedge formation on said pin.

7. The improvement defined in claim 6 wherein one of said cage protrusion and said pin controlled by the steering lock has a recess with two wedge surfaces, in which a wedging projection engages so as to produce a centering action.

* * * * *